Patented Jan. 11, 1938

2,105,277

UNITED STATES PATENT OFFICE 2,105,277

PROCESS OF WATER PURIFICATION

Oliver M. Urbain, Columbus, Ohio, assignor to Charles H. Lewis, Harpster, Ohio

No Drawing. Application November 25, 1936, Serial No. 112,827

7 Claims. (Cl. 210—2)

This application is a continuation-in-part of my copending application Serial No. 700,939, filed December 4, 1933.

This invention relates to a novel process for purification of polluted waters, such as sewage and industrial waste.

While the process is of general application, it has especial utility in the treatment of sewage which is high in amines, such as the sewage from cities which includes the waste from packing and rendering industries.

Many polluting compounds are present in the water in true solution and cannot be removed by any chemical precipitation process. It is, therefore, essential to treat the effluent from the chemical precipitation process in order to free it of these polluting compounds. Since the compounds in solution must be removed from the effluent, it is essential that the effluent be produced under such conditions as will render it susceptible of treatment to eliminate the polluting compounds carried in solution therein.

It is the object of the present invention to provide a complete purification process for removing all of the polluting organic substances from the water.

The first step in the process is directed to the removal of emulsoids without any increase in the pH of the solution. The emulsoids can be desolvated by the addition of a hydrous oxide such, for example, as hydrous stannic oxide. Other analogous hydrous oxides may be used. Any of the heavy metal salts having anions of a valence of one can be used for this purpose. For each one part per million of emulsoid present, approximately one part per million of the hydrous oxide is required for the desolvation. After the emulsoids are desolvated, it is necessary to charge the suspensoids (desolvated emulsoids) to a point where they assume a condition of maximum cataphoretic velocity.

High valent anions are best suited for increasing the cataphoretic velocity of the suspensoids. Phosphoric acid, $H_3PO_4$, is an example of an inexpensive reagent which may be employed. The quantity of phosphoric acid or like reagent to employ can be determined by experiment through adding the reagent in measured quantities to a measured quantity of the sewage in increasing amounts until the suspensoids reach a point of maximum cataphoretic velocity which may be determined by any of the conventional methods for measuring cataphoretic velocity.

I have found that high valent anions meeting the following specifications may be employed in my process to effect an increase in the cataphoretic velocity of the suspensoids.

The reagent for releasing the high valent anions must, of course, be ionizable in water; the anion released must not be subject to reionization or breakdown into simpler ions of lower valence in less than five minutes with constant agitation; the valence of the anion should be at least two units higher than the valence of the cation released by ionization of the reagent and preferably greater in order to avoid antagonism; and the cation of the reagent should have a low valence, preferably one. Anions of high molecular weight are furthermore preferred since they are more strongly adsorbed and, therefore, reduce the time required to bring the suspensoids to a state of maximum cataphoretic velocity.

Examples of reagents suitable for releasing anions meeting the above specifications are the tribasic phosphates and the ferrocyanides of the alkali metals. Trisodium phosphate, $Na_3PO_4$, and potassium ferrocyanide $K_4Fe(CN)_6$ are illustrative of these. It will be noted that the anion of $Na_3PO_4$ is two units higher in valence than the cation and is strongly adsorbed and stable against re-ionization. The anion of $K_4Fe(CN)_6$, potassium ferrocyanide, has a valence three units higher than the cation and is likewise stable against re-ionization.

The first step in the process, therefore, comprises the addition of a metallic salt, such as stannic chloride, and, for example, phosphoric acid in proper quantities and agitating for about four minutes. The solution is rendered somewhat acid by this treatment and is not suited for base exchange.

The second step is accordingly directed to elevating the pH to a point between pH 6.5 and pH 7.5, preferably to a point as near to pH 7.0 as possible. This is accomplished by the addition to the solution of calcium carbonate which acts as a buffer. Precipitated calcium carbonate, soft marls, or chalks may be employed as the buffer, as well as the material recovered from alkali deposits. The buffer should be employed in an amount approximately 20% in excess of the quantity required to neutralize the entire acid content of the solution. After the addition of the buffer, the solution is again agitated vigorously for around ten minutes and then passed into sedimentation basins. The precipitated matter settles rapidly, leaving a supernatant liquid of sparkling clarity but containing the soluble polluting compounds. The pH in this effluent is invariably around 6.8, which is almost ideal for the base exchange reactions which, in accordance with the process, are to follow.

I will now pass to the third and last step of the process.

The effluent from the sedimentation basins is passed through a filter charged with an alkaline earth zeolite. A large portion of the organic cations is base-exchanged and retained in the zeolite. Cations of compounds such as the following are removed 100%:

Ammonium salts
Ethylamine hydrochloride
Benzylamine hydrochloride
Histamine phosphate
Tyramine phosphate
Hordemin sulfate
Trimethylamine hydrochloride
Methylene blue
Histidine hydrochloride
Pyridine
Pepsidine and
Alizarine When the zeolite filter is nearing exhaustion, it can be regenerated by back-washing with a solution of calcium chloride. If it is desired to recover the organic compounds, they may be recovered by distillation of the washings from the regeneration step.

Following passage of the effluent through the zeolite filter, it may be discharged without further treatment.

Having thus described my invention, what I claim is:

1. A process for purifying organically polluted water comprising initially treating the water with a heavy metal salt and a high valent anion having the property of increasing the cataphoretic velocity of the suspensoids, then separately adding an alkaline buffer to yield a solution having a pH within the range from 6.5 to 7.5, passing the solution to a sedimentation zone, taking off the effluent, and passing the same through a filter charged with an alkaline earth zeolite.

2. A process for purifying organically polluted water comprising initially treating the water with stannic chloride and phosphoric acid, then adding an alkaline buffer to yield a solution having a pH within the range from 6.5 to 7.5, passing the solution to a sedimentation zone, taking off the effluent, and passing the same through a filter charged with an alkaline earth zeolite.

3. A process for purifying organically polluted water comprising initially treating the water with a heavy metal salt and phosphoric acid, then adding calcium carbonate to yield a solution having a pH within the range from 6.5 to 7.5, passing the solution to a sedimentation zone, taking off the effluent, and passing the same through a filter charged with an alkaline earth zeolite.

4. A process for purifying organically polluted water comprising initially treating the water with a heavy metal salt and an anion furnishing salt in which the anion valence exceeds the cation valence by two units, then separately adding an alkaline buffer to yield a solution having a pH within the range from 6.5 to 7.5, passing the solution to a sedimentation zone, taking off the effluent, and passing the same through a filter charged with an alkaline earth zeolite.

5. A process for purifying organically polluted water comprising initially treating the water with a heavy metal salt and a high valent anion having a valence at least two units higher than the cation of the material furnishing the anion, then separately adding an alkaline buffer to yield a solution having a pH within the range from 6.5 to 7.5, passing the solution to a sedimentation zone, taking off the effluent, and passing the same through a filter charged with an alkaline earth zeolite.

6. A process for purifying organically polluted water comprising initially treating the water with a heavy metal salt and a high valent anion characterized by its stability against decomposition into anions of lower valence in water when agitated in water for a period of at least five minutes, then separately adding an alkaline buffer to yield a solution having a pH within the range from 6.5 to 7.5, passing the solution to a sedimentation zone, taking off the effluent, and passing the same through a filter charged with an alkaline earth zeolite.

7. A process for purifying organically polluted water comprising initially treating the water with a heavy metal salt and a high valent anion, said anion being formed by the ionization of a salt, the anion of which has a valence at least two units higher than that of the cation, and said anion being stable against decomposition into anions of lower valence upon constant agitation in water for a period of at least five minutes, then separately adding an alkaline buffer to yield a solution having a pH within the range from 6.5 to 7.5, passing the solution to a sedimentation zone, taking off the effluent, and passing the same through a filter charged with an alkaline earth zeolite.

OLIVER M. URBAIN.